US010082972B2

(12) United States Patent
Gu et al.

(10) Patent No.: US 10,082,972 B2
(45) Date of Patent: *Sep. 25, 2018

(54) METHOD AND SYSTEM FOR POOLING, PARTITIONING, AND SHARING NETWORK STORAGE RESOURCES

(71) Applicant: Huawei Technologies Co., Ltd., Shenzhen (CN)

(72) Inventors: Jiongjiong Gu, Shenzhen (CN); Xiaoyong Min, Shenzhen (CN); Daohui Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,226

(22) Filed: Aug. 11, 2017

(65) Prior Publication Data

US 2017/0336998 A1 Nov. 23, 2017

Related U.S. Application Data

(63) Continuation of application No. 14/754,378, filed on Jun. 29, 2015, now Pat. No. 9,733,848, which is a (Continued)

(30) Foreign Application Priority Data

Dec. 31, 2012 (WO) ................ PCT/CN2012/088109

(51) Int. Cl.
*G06F 3/06* (2006.01)
*H04L 29/08* (2006.01)

(52) U.S. Cl.
CPC .............. *G06F 3/0619* (2013.01); *G06F 3/06* (2013.01); *G06F 3/067* (2013.01); *G06F 3/0665* (2013.01);
(Continued)

(58) Field of Classification Search
CPC ...... G06F 3/0665; G06F 3/0631; G06F 3/067; G06F 3/0689; G06F 3/0683
(Continued)

(56) References Cited

U.S. PATENT DOCUMENTS 6,389,503 B1 * 5/2002 Georgis ................ G06F 3/0607
369/32.01
6,732,166 B1    5/2004 Woodruff
(Continued)

FOREIGN PATENT DOCUMENTS

CN    1602480 A    3/2005
CN    1652090 A    8/2005
(Continued)

*Primary Examiner* — Than Vinh Nguyen
(74) *Attorney, Agent, or Firm* — Huawei Technologies Co., Ltd.

(57) ABSTRACT

Embodiments of the present invention provide a method and a system for sharing a storage resource, where storage resources of a hard disk and a storage array are divided into multiple storage partitions and the multiple storage partitions form a shared storage resource pool, a read-write control module is allocated to each storage partition, and global partition information is generated to record a correspondence between each storage partition in the shared storage resource pool and the read-write control module. The embodiments of the present invention implement fast and simple integration of heterogeneous storage resources, and therefore can efficiently use various storage resources, save cost, and avoid a resource waste.

8 Claims, 7 Drawing Sheets

Related U.S. Application Data continuation of application No. PCT/CN2013/091253, filed on Dec. 31, 2013.

(52) U.S. Cl.
CPC ........ G06F 3/0689 (2013.01); H04L 67/1097 (2013.01); *G06F 3/0683* (2013.01)

(58) Field of Classification Search
USPC .......................................................... 711/114
See application file for complete search history.

(56) References Cited

U.S. PATENT DOCUMENTS

| | | |
|---|---|---|
| 6,829,610 B1 | 12/2004 | Hickman et al. |
| 7,565,566 B2 | 7/2009 | Davies et al. |
| 7,624,170 B2 | 11/2009 | Das et al. |
| 7,661,014 B2 | 2/2010 | Davies et al. |
| 8,185,777 B2 | 5/2012 | Davies et al. |
| 8,290,919 B1 | 10/2012 | Kelly et al. |
| 8,396,937 B1 | 3/2013 | O'Krafka et al. |
| 9,733,848 B2 * | 8/2017 | Gu ........................ G06F 3/0619 |
| 2003/0055972 A1 | 3/2003 | Fuller et al. |
| 2004/0215749 A1* | 10/2004 | Tsao .................... H04L 67/1097 |
| | | 709/220 |
| 2006/0004957 A1 | 1/2006 | Hand, III et al. |
| 2006/0143350 A1 | 6/2006 | Miloushev et al. |
| 2007/0079100 A1 | 4/2007 | Shiga et al. |
| 2009/0177860 A1* | 7/2009 | Zhu ........................ G06F 3/0613 |
| | | 711/173 |
| 2009/0235269 A1 | 9/2009 | Nakajima et al. |
| 2011/0066808 A1 | 3/2011 | Flynn et al. |
| 2011/0087833 A1 | 4/2011 | Jones |
| 2011/0134749 A1 | 6/2011 | Speks et al. |
| 2014/0189128 A1 | 7/2014 | Gu et al. |

FOREIGN PATENT DOCUMENTS

| | | |
|---|---|---|
| CN | 101169725 A | 4/2008 |
| CN | 101281454 A | 10/2008 |
| CN | 101374192 A | 2/2009 |
| CN | 102164177 A | 8/2011 |
| CN | 102223409 A | 10/2011 |
| CN | 102520883 A | 6/2012 |
| CN | 102521063 A | 6/2012 |
| CN | 102664923 A | 9/2012 |
| CN | 102696010 A | 9/2012 |
| CN | 102739771 A | 10/2012 |
| CN | 102870381 A | 1/2013 |
| JP | 2001337850 A | 12/2001 |
| JP | 2005512232 A | 4/2005 |
| JP | 2007087102 A | 4/2007 |
| WO | 03050707 A1 | 6/2003 |
| WO | 2008049738 A1 | 5/2008 |
| WO | 2014101218 A1 | 7/2014 |

* cited by examiner

METHOD AND SYSTEM FOR POOLING, PARTITIONING, AND SHARING NETWORK STORAGE RESOURCES

CROSS-REFERENCE TO RELATED APPLICATIONS

This application is a continuation of U.S. patent application Ser. No. 14/754,378, filed on Jun. 29, 2015, now allowed, which is a continuation of International Application No. PCT/CN2013/091253, filed on Dec. 31, 2013. The International Application claims priority to International Patent Application No. PCT/CN2012/088109, filed on Dec. 31, 2012. All of the afore-mentioned patent applications are hereby incorporated by reference in their entireties.

TECHNICAL FIELD

The present invention relates to the field of communications technologies, and in particular, to a method and a system for sharing a storage resource.

BACKGROUND

In a cloud computing application, a server cluster system integrates computing resources, storage resources, and network resources, and provides, by using a technology such as virtualization and via a network, the resources to users for use. A form of the application is, for example, a virtual machine (Virtual Machine, "VM" for short), computing capability, storage capability renting, or the like.

At present, for reasons such as different types of resource demands, a server cluster system generally use different devices to provide storage devices, and sources of the storage resources are diversified, for example, a storage resource built in a server node, and an independently deployed storage resource, where the independently deployed storage resource may be, for example, a dedicated storage array or a storage server such as a storage area network (Storage Area Network, "SAN" for short).

In the prior art, storage devices of a server cluster system independently provide external storage services, resulting in low combined utilization of storage resources. In addition, storage resources, of network storage devices, primitively accumulated by enterprises cannot be reused by the server cluster system, causing a tremendous waste.

SUMMARY

Embodiments of the present invention provide a method and a system for sharing a storage resource, which are used to integrate, share and utilize heterogeneous storage resources, thereby improving utilization of the storage resources.

According to a first aspect, an embodiment of the present invention provides a method for sharing a storage resource, applied to a server cluster system, where the server cluster system includes a server node and a network storage node, the server node includes a hard disk, the network storage node includes a storage array, and the method includes:

dividing storage resources of the hard disk and the storage array into multiple storage partitions, where the multiple storage partitions form a shared storage resource pool;

allocating a read-write control module to each storage partition;

generating global partition information, where the global partition information records a correspondence between each storage partition in the shared storage resource pool and the read-write control module;

receiving a storage request message, and determining a storage partition corresponding to the storage request message;

determining, according to the global partition information, a read-write control module that is corresponding to the storage partition corresponding to the storage request message; and sending the storage request message to the determined read-write control module, so that the read-write control module performs an operation requested by the storage request message.

With reference to the first aspect, in a first possible implementation manner, the determining a storage partition corresponding to the storage request message includes:

determining an ID of a user volume in which data to be operated according to the storage request message is located and a logical block address LBA of at least one data block of the data to be operated; and determining, according to the ID of the user volume and the LBA of the at least one data block, a storage partition corresponding to the at least one data block.

With reference to the first possible implementation manner of the first aspect, in a second possible implement manner, the method further includes:

setting up metadata of each storage partition in the shared storage resource pool, where the metadata of each storage partition records a correspondence between an ID of the storage partition and an ID of a data block allocated to the storage partition, where the determining, according to the ID of the user volume and the LBA of the at least one data block, a storage partition corresponding to the at least one data block includes:

determining an ID of the at least one data block according to the ID of the user volume and the LBA of the at least one data block, querying the metadata of each storage partition, and determining an ID of the storage partition corresponding to the at least one data block.

With reference to the first aspect or the first possible implementation manner of the first aspect, in a third possible implementation manner, the determining, according to the ID of the user volume and the LBA of the at least one data block, a storage partition corresponding to the at least one data block includes:

forming a key value of each data block by using the ID of the user volume and an LBA of each data block, computing a value value corresponding to the key value of each data block, and determining, according to the value value, a storage partition corresponding to each data block.

With reference to the first possible implementation manner of the first aspect, the second possible implementation manner of the first aspect, or the third possible implementation manner of the first aspect, in a fourth possible implementation manner, the receiving a storage request message includes: receiving a user volume creation command, where the user volume creation command indicates a size of the user volume, where the determining an ID of a user volume in which data to be operated according to the storage request message is located and a logical block address LBA of at least one data block of the data to be operated, and determining, according to the ID of the user volume and the LBA of the at least one data block, a storage partition corresponding to the at least one data block, includes:

allocating the ID of the user volume to the user volume;

determining, according to the size of the user volume, a size of an initial storage resource allocated to the user volume, and determining the LBA of the at least one data block according to the size of the initial storage resource; and determining, according to the ID of the user volume and the LBA of the at least one data block, the storage partition corresponding to the at least one data block.

With reference to the first possible implementation manner of the first aspect, the second possible implementation manner of the first aspect, or the third possible implementation manner of the first aspect, in a fifth possible implementation manner, the receiving a storage request message includes: receiving a data write operation request;

determining, according to a file name carried in the data write operation request, an ID of a user volume corresponding to a current write operation;

dividing to-be-written data into multiple to-be-written data blocks, and allocating an LBA to each to-be-written data block;

determining, according to the ID of the user volume corresponding to the current write operation, and the LBA of each to-be-written data block, a storage partition corresponding to each to-be-written data block;

determining, according to the global partition information, a read-write control module that is corresponding to the storage partition corresponding to each to-be-written data block;

generating multiple data block write commands, where each data block write command is corresponding to one to-be-written data block, and each data block write command carries the to-be-written data block and an ID of the to-be-written data; and separately sending each data block write command to the read-write control module corresponding to each to-be-written data block, so that the read-write control module corresponding to each to-be-written data block writes each to-be-written data block into a storage hardware resource.

With reference to the first possible implementation manner of the first aspect, the second possible implementation manner of the first aspect, or the third possible implementation manner of the first aspect, in a fifth possible implementation manner, the receiving a storage request message includes: receiving a data read operation request, where the data read operation request carries a file name and an offset of to-be-read data;

determining, according to the file name carried in the data read operation request, an ID of a user volume corresponding to a current read operation;

determining LBAs of multiple to-be-read data blocks according to offset information of the to-be-read data;

determining, according to the ID of the user volume corresponding to the current read operation and the LBA of each to-be-read data block, a storage partition corresponding to each to-be-read data block;

determining, according to the global partition information, read-write control modules that are corresponding to the storage partitions corresponding to the multiple to-be-read data blocks;

generating multiple data block read commands, where each data block read command is corresponding to one to-be-read data block, and each data block read command carries the to-be-read data block and an ID of the to-be-read data block; and separately sending each data block read command to the read-write control module corresponding to each to-be-read data block, so that the read-write control module corresponding to each to-be-read data block reads each to-be-read data block.

According to a second aspect, an embodiment of the present invention provides a server cluster system, where the server cluster system includes a server node and a network storage node, the server node includes a hard disk, the network storage node includes a storage array, a distributed storage controller runs on the server node, and the distributed storage controller includes:

a metadata controller, configured to: divide storage resources of the hard disk and the storage array into multiple storage partitions, where the multiple storage partitions form a shared storage resource pool; allocate a read-write control module to each storage partition; generate global partition information, where the global partition information records a correspondence between each storage partition in the shared storage resource pool and the read-write control module; and deliver the global partition information to a virtual block service module;

the virtual block service module, configured to: face a service layer, and receive a storage request message; determine a storage partition corresponding to the storage request message; determine, according to the global partition information, a read-write control module that is corresponding to the storage partition corresponding to the storage request message; and send the storage request message to the determined read-write control module; and the read-write control module, configured to face the hard disk or the network storage node, and perform an operation requested by the storage request message.

With reference to the second aspect, in a first possible implementation manner, the read-write control module includes an object storage delegate and a SAN storage agent, where:

the metadata controller is specifically configured to allocate the object storage delegate to a storage partition of the local hard disk, as a read-write control module, and allocate the SAN storage agent to a storage partition of the storage array, as a read-write control module;

the object storage delegate is configured to: receive the storage request message, determine a physical address corresponding to the storage request message, and perform, according to the physical address, the operation requested by the storage request message in the hard disk; and the SAN storage agent is configured to: receive the storage request message, determine a logical address that is of the network storage node and corresponding to the storage request message, and perform, according to the logical address, the operation requested by the storage request message in the storage array.

With reference to the second aspect, in a second possible implementation manner, the virtual block service module is specifically configured to determine an ID of a user volume in which data to be operated according to the storage request message is located and a logical block address LBA of at least one data block of the data to be operated, and determine, according to the ID of the user volume and the LBA of the at least one data block, a storage partition corresponding to the at least one data block.

With reference to the second possible implementation manner of the second aspect, in a third possible implementation manner, the virtual block service module is specifically configured to: set up metadata of each storage partition in the shared storage resource pool, where the metadata of each storage partition records a correspondence between an ID of the storage partition and an ID of a data block allocated to the storage partition; determine an ID of the at least one data block according to the ID of the user volume and the LBA of the at least one data block; query the metadata of each storage partition; and determine an ID of the storage partition corresponding to the at least one data block.

With reference to the second possible implementation manner of the second aspect, in a fourth possible implementation manner, the virtual block service module is specifically configured to form a key value of each data block by using the ID of the user volume and an LBA of each data block, compute a value value corresponding to the key value of each data block, and determine, according to the value value, a storage partition corresponding to each data block.

With reference to the second aspect and any one of the possible implementation manners of the second aspect, in a fifth possible implementation manner, the virtual block service module is specifically configured to: receive a user volume creation command, where the user volume creation command indicates a size of the user volume; allocate the ID of the user volume to the user volume; determine, according to the size of the user volume, a size of an initial storage resource allocated to the user volume, and determine the LBA of the at least one data block according to the size of the initial storage resource; and determine, according to the ID of the user volume and the LBA of the at least one data block, the storage partition corresponding to the at least one data block.

With reference to the second aspect and any one of the possible implementation manners of the second aspect, in a sixth possible implementation manner, the virtual block service module is specifically configured to: receive a data write operation request; determine, according to a file name carried in the data write operation request, an ID of a user volume corresponding to a current write operation; divide to-be-written data into multiple to-be-written data blocks, and allocate an LBA to each to-be-written data block; determine, according to the ID of the user volume corresponding to the current write operation, and the LBA of each to-be-written data block, a storage partition corresponding to each to-be-written data block; determine, according to the global partition information, a read-write control module that is corresponding to the storage partition corresponding to each to-be-written data block; generate multiple data block write commands, where each data block write command is corresponding to one to-be-written data block, and each data block write command carries the to-be-written data block and an ID of the to-be-written data; and separately send each data block write command to the read-write control module corresponding to each to-be-written data block.

With reference to the second aspect and any one of the possible implementation manners of the second aspect, in a seventh possible implementation manner, the virtual block service module is specifically configured to: receive a data read operation request, where the data read operation request carries a file name and an offset of to-be-read data; determine, according to the file name carried in the data read operation request, an ID of a user volume corresponding to a current read operation; determine LBAs of multiple to-be-read data blocks according to offset information of the to-be-read data; determine, according to the ID of the user volume corresponding to the current read operation and the LBA of each to-be-read data block, a storage partition corresponding to each to-be-read data block; determine, according to the global partition information, read-write control modules that are corresponding to the storage partitions corresponding to the multiple to-be-read data blocks; generate multiple data block read commands, where each data block read command is corresponding to one to-be-read data block, and each data block read command carries the to-be-read data block and an ID of the to-be-read data block; and separately send each data block read command to the read-write control module corresponding to each to-be-read data block.

With reference to the second aspect and any one of the possible implementation manners of the second aspect, in an eighth possible implementation manner, the metadata controller is further configured to: separately determine deployment conditions of the object storage delegate and the SAN storage agent on the server node; generate view information of the read-write control module according to the determined deployment conditions, where the view information of the read-write control module is used to indicate information about a server node on which each read-write control module is deployed; and deliver the view information of the read-write control module to the virtual block service module; and the virtual block service module is specifically configured to determine routing information of the read-write control module according to the view information of the read-write control module, and send the storage request message to the determined read-write control module.

With reference to the eighth possible implementation manner of the second aspect, in a ninth possible implementation manner, the metadata controller is specifically configured to: determine to deploy the object storage delegate on a server node that has a hard disk resource in the server cluster system, and determine to deploy the SAN storage agent on a server node with small load in the server cluster system.

With reference to the eighth possible implementation manner of the second aspect, in a tenth possible implementation manner, the metadata controller is further configured to collect an available storage resource of the hard disk of the server node and an available storage resource of the storage array of the network storage node, and divide the available storage resources of the hard disk and the storage array into multiple storage partitions.

According to a third aspect, an embodiment of the present invention provides a computer.

According to a fourth aspect, an embodiment of the present invention provides a computer storage medium.

It can be seen from the foregoing technical solutions that, in the embodiments of the present invention, storage resources of a hard disk and a storage array are divided into multiple storage partitions and the multiple storage partitions form a shared storage resource pool, a read-write control module is allocated to each storage partition, and global partition information is generated to record a correspondence between each storage partition in the shared storage resource pool and the read-write control module. In this way, when a storage request message is received subsequently, a storage partition corresponding to the storage request message can be determined, a read-write control module that is corresponding to the storage partition corresponding to the storage request message can be determined according to the global partition information, and finally the storage request message can be sent to the determined read-write control module, so that the read-write control module performs an operation requested by the storage request message. The embodiments of the present invention implement fast and simple integration of heterogeneous storage resources, and therefore can efficiently use various storage resources, save cost, and avoid a resource waste.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the symbol "/" in this specification generally represents that associated objects before and after the symbol are in an "or" relationship.

In technical solutions provided by embodiments of the present invention, a distributed controller is deployed on a server to implement integration of heterogeneous storage resources, so that integration and use of the heterogeneous storage resources can be implemented without a need to additionally purchase a heterogeneous storage and integration device, thereby improving a price/performance ratio of a system.

In the embodiments of the present invention, after computing resources and storage resources are vertically integrated, various storage resources are then horizontally integrated, and particularly, heterogeneous storage resources are integrated and used. In the embodiments of the present invention, a distributed storage controller is deployed on a server, and various heterogeneous storage resources are used to form a cluster-sharing storage resource pool for allocating and managing the storage resources in a unified manner. This method can implement fast and simple integration of the heterogeneous storage resources, and therefore can efficiently use various storage resources, save cost, and avoid a resource waste.

The heterogeneous storage resources mentioned in the embodiments of the present invention refer to two or more different types of storage devices. Specifically, a storage device of a first type refers to a local hard disk built in a server node, such as a solid state disk (Solid State Disk, SSD), a mechanical hard disk (Hard Disk, HD), or a hybrid hard disk (Hybrid Hard Disk, HHD); a storage device of a second type refers to a network storage node, where the network storage node may be a storage area network (Storage Area Network, SAN) storage device, and may also be a network attached storage (Network Attached Storage, NAS) storage device, and the network storage node is an external hardware device of a server, but is not a device built in the server.

Figure 1:
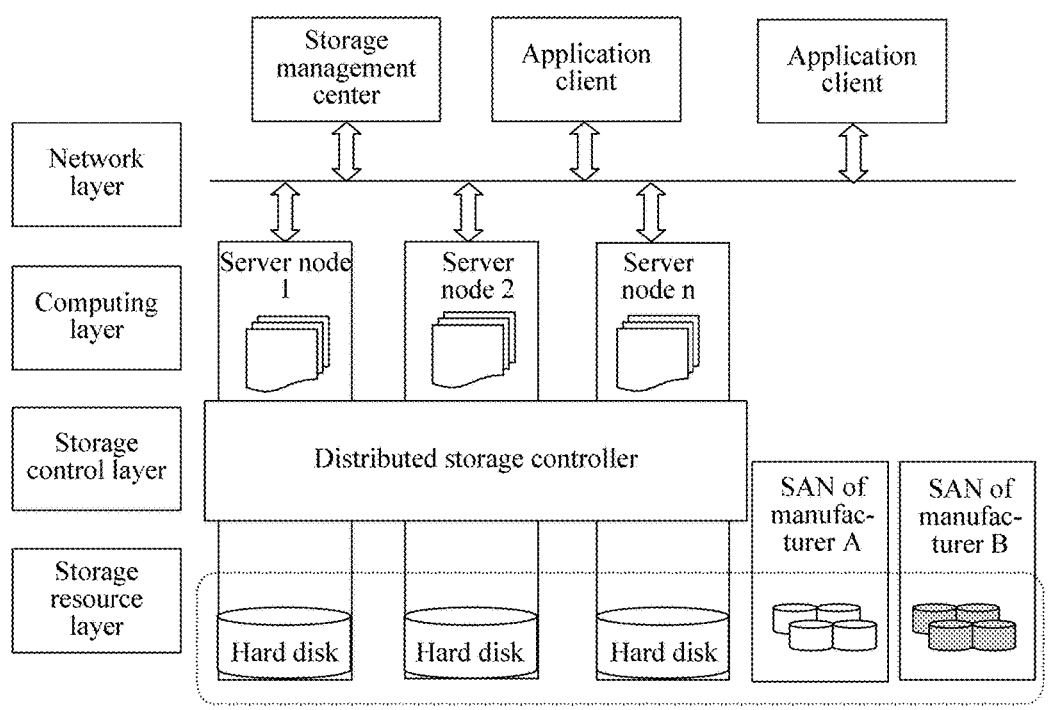
FIG. 1 is a schematic block diagram of a server cluster system according to an embodiment of the present invention.

FIG. 1 is a composition diagram of a server cluster system according to an embodiment of the present invention. The server cluster system communicates with an application client or a storage management center by using a network layer. The server cluster system includes a server node and a network storage node (this embodiment uses an SAN storage device as an example), there may be one or more server nodes and one or more network storage nodes, and this embodiment uses 2 SAN storage nodes as an example. A physical device of each server node includes a CPU, a memory, a network, a hard disk, and the like, and a physical device of the network storage node includes a storage array and a controller of the storage array. In this embodiment, physical devices, such as the CPU and the memory of the server node, which are used to provide computing resources for an application program connected to the server cluster system are collectively referred to as computing resources of the server cluster system and provide a basis for forming a computing layer; the hard disk of the server node and the storage array of the network storage node that are on a storage resource layer are collectively referred to as storage resources of the server cluster system.

The server cluster system is used to externally provide the computing resources to different application programs for use. For example, a web application or a HADOOP distributed cluster system may run in the server cluster system. The computing resources of the server cluster system may be further abstracted into multiple virtual machines; different application programs run on each virtual machine, or the multiple virtual machines form a virtual machine cluster to provide services for a same application program. This embodiment does not impose a limitation on a specific implementation form. When an application program runs in the server cluster system, related data of the application program may be stored in a storage resource of the server cluster system, that is, stored in the hard disk of the server node or the storage array of the SAN node, or may be stored in both the hard disk of the server node and the storage array of the SAN node.

The server cluster system in this embodiment of the present invention further runs a distributed storage controller, where the distributed storage controller is configured to divide storage resources of the hard disk of the server node and the storage array provided by a network storage node (such as an SAN) into multiple storage partitions, where the multiple storage partitions form a shared storage resource pool of the server cluster system, so that an application program running in the server cluster system may obtain a distributed storage resource block from the shared storage resource pool and use the distributed storage resource block, thereby ensuring higher utilization of the storage resources and even distribution of storage, and improving read-write efficiency of the storage resources. In this embodiment of the present invention, the distributed storage controller is implemented by using a software module installed in a hardware device of a server, and therefore can avoid purchasing an additional hardware device as a storage control device. The solution is more economical and cost-saving.

The distributed storage controller described in this embodiment of the present invention is a general term for a storage control functional module that runs on each server node, and the distributed storage controller provided by the solution may include different functional modules. However, during actual deployment, each server node may run different functional modules of the distributed storage controller according to a function and a deployment policy of the server node. That is, according to a deployment policy of the server cluster system, different functional modules of the distributed storage controller may run on different server nodes, and each server node may run all functional modules of the distributed storage controller, or may run some functional modules of the distributed storage controller. Specific deployment manners are described in detail in the following.

The distributed storage controller is mainly configured to provide a data access interface for the computing resources of the server cluster system, and perform management and read-write control on shared storage resources of the server cluster system.

Specifically, the distributed storage controller may be functionally divided into the following modules:

a metadata controller MDC, configured to: acquire a storage resource of the local hard disk of the server node and a storage resource of the storage array of the network storage node, divide the storage resource of the server node and the storage resource of the network storage node into multiple storage partitions (partition), allocate a storage partition identifier to each storage partition, and then form a shared storage resource pool by using the multiple storage partitions, so that an application program running in the server cluster system uses the shared storage resources.

Specifically, the MDC may first perform a health check on the hard disk resource of the server node and the storage array of the network storage node, and collect available storage resources thereof to form the shared storage resource pool. During partition division, the MDC may divide the resources into storage partitions of a same size, for example, division in a unit of 10 GB. Information about the storage resources collected by the MDC may include: a capacity and an ID of each hard disk, an ID of a server on which each hard disk is located, a capacity and an ID of each logical storage unit LUN included in each storage array, and an ID of a network storage node on which each LUN is located.

The information about the storage resources collected by the MDC is, for example, as follows:

Disk ID=1, Disk Capacity=50 GB, Server ID=1;
Disk ID=2, Disk Capacity=50 GB, Server ID=1;
Disk ID=3, Disk Capacity=50 GB, Server ID=2;
LUN=1, LUN Capacity=50 GB, SAN ID=1;
LUN=2, LUN Capacity=50 GB, SAN ID=1; and
LUN=3, LUN Capacity=50 GB, SAN ID=1.

After collecting the foregoing information about the storage resources, the MDC divides the storage resources of Disks 1-3 and LUNs 1-3 into multiple storage partitions, where the storage partitions may be equal or may be unequal in size. For example, the storage resources are divided equally in a unit of 10 GB, and the storage resources of the DISKs and LUNs are divided into 30 storage partitions, where a size of each storage partition is 10 GB, and partition identifiers of the storage partitions are 1-30, that is, P1-P30. The MDC forms a shared storage resource pool by using the storage partitions P1-P30, where the storage partitions P1-P15 include the storage resource of the hard disk built in the server node, and the storage partitions P16-P30 include the storage resource of the storage array of the SAN node. That is, the shared storage resources include two types of storage partitions, where the storage partitions of the first type are P1-P15, and the storage partitions of the second type are P16-P30.

The distributed storage controller further includes a read-write control module, where the read-write control module in this embodiment includes an object storage delegate (Object Storage Delegate, OSD) and a SAN storage agent (SAN Storage Agent, SSA). The OSD is configured to perform read-write control on the storage resource of the hard disk built in the server node, that is, implement data storage in and data acquisition from the local hard disk of the server node; for example, the OSD performs read-write control on the storage partitions P1-P15 in this embodiment. The SSA performs read-write control on the storage resource of the storage array of the SAN node, that is, implements data storage in and data acquisition from the storage array of the SAN node; for example, the SSA performs read-write control on the storage partitions P16-P30 in this embodiment. Both the OSD and the SSA are functional modules of the distributed storage controller, and after collecting the information about the storage resources of the server cluster system, the MDC may further determine, according to deployment conditions of the storage resources, how to deploy the OSD and the SSA in the server cluster system. Specifically, the MDC may run the OSD on each server node that has a local hard disk in the server cluster system; the MDC may run the SSA on each server node in the server cluster system, and may also deploy, according to a load condition of each server node, the SSA on a server node with small load. For example, the MDC may compute load conditions of computing resources on all the server nodes in a unified manner, and generate global SSA deployment information according to a capacity of the storage array of each SAN storage node and a weight. In this embodiment, for example, the MDC runs an OSD1 on a server node 1, runs an OSD2 on a server node 2, and runs an SSA1 on the server node 2.

After determining the deployment conditions of the OSD and the SSA, the MDC may further record OSD view information and SSA view information. The OSD view information includes a server on which the OSD is correspondingly deployed, which is used to indicate routing information of the OSD; moreover, the OSD view may further include each OSD, a status corresponding to each OSD, and a DISK correspondingly managed by each OSD. The SSA view information includes a server on which the SSA is correspondingly deployed, which is used to indicate routing information of the SSA; moreover, the SSA view information further includes a status of each SSA and an LUN, of the SAN storage array, which is correspondingly managed by each SSA. For example, the following Table 1 and Table 2 show the OSD view information and the SSA view information respectively:

TABLE 1

OSD view information

| OSD information | Deployment node information | OSD status (optional) | Storage device information (optional) |
|---|---|---|---|
| OSD1 | Server 1 | IN | DISK1 and DISK2 |
| OSD2 | Server 2 | IN | DISK3 |

TABLE 2

SSA view information

| SSA information | Deployment node information | SSA status (optional) | Storage device information (optional) |
|---|---|---|---|
| SSA1 | Server 2 | IN | LUN1, LUN2 and LUN3 |

The foregoing Table 1 and Table 2 respectively describe OSD view information and SSA view information, and a person skilled in the art may also combine the foregoing Table 1 and Table 2 into view information of one read-write control module.

After dividing the storage resources into storage partitions and determining deployment of the read-write control module, the MDC may further configure a corresponding read-write control module for each storage partition. An allocation process may be relatively flexible and may be determined by the MDC according to a division condition of the storage partitions and actual running load. For example, the storage partitions P1-10 are correspondingly deployed on the server node 1, and the OSD1 running on the server node 1 serves as a read-write control module for the storage partitions; the storage partitions P11-20 are correspondingly deployed on the server node 2, and the OSD2 running on the server node 2 serves as a read-write control module for the storage partitions; the storage partitions P21-30 are correspondingly deployed on the server node 2, and the SSA1 running on the server node 2 serves as a read-write control module for the storage partitions.

Figure 2:
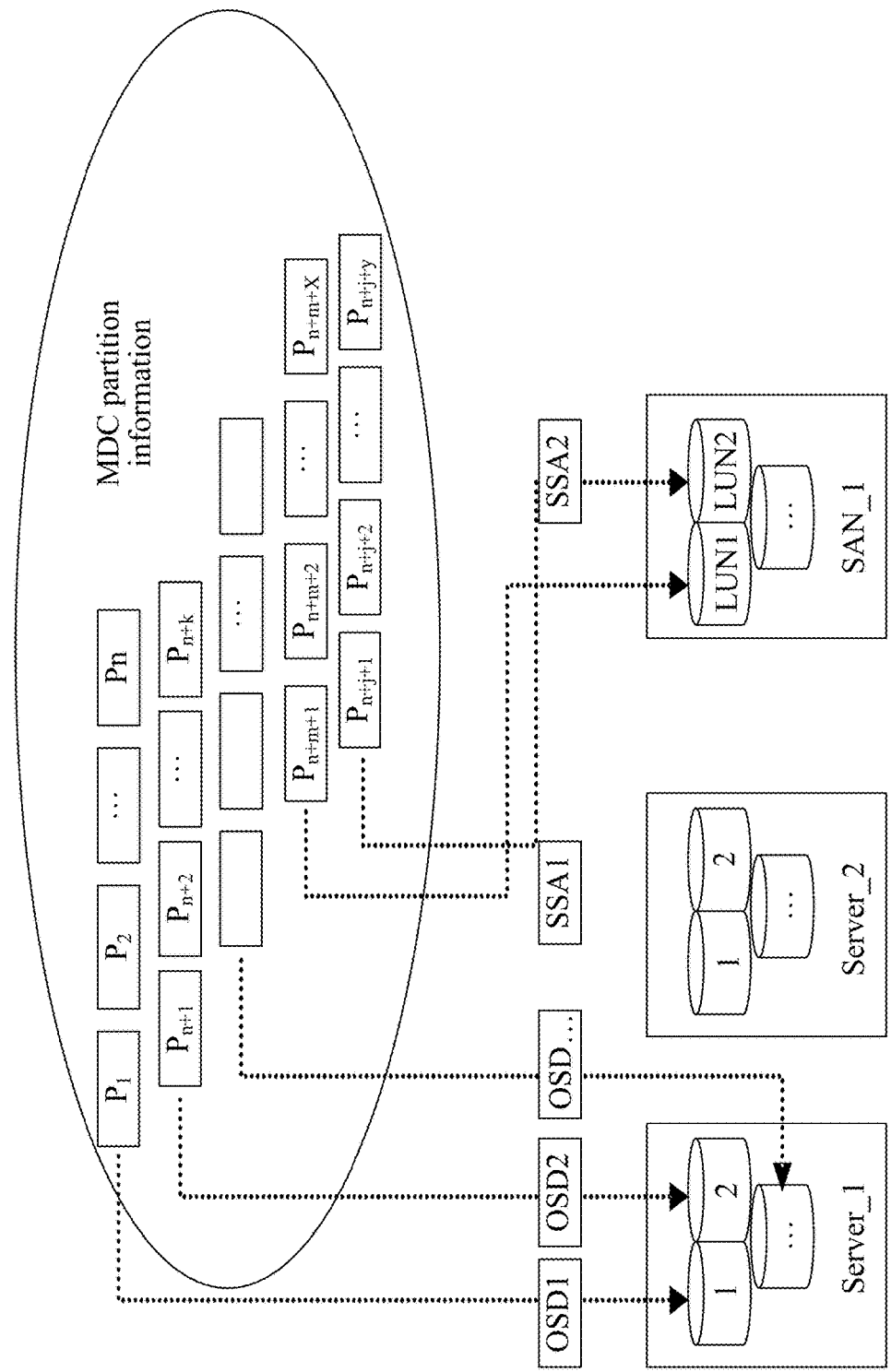
FIG. 2 is a schematic diagram illustrating division of shared storage resources according to an embodiment of the present invention.

Further, the MDC may further generate global partition information (a global partition information table is used as an example in this embodiment of the present invention), where the global partition information table records a distribution condition of storage partitions in the server cluster system. As shown in FIG. 2 and Table 3, the global partition information table records a read-write control module (an OSD or an SSA) corresponding to each storage partition. The global partition information table may further record information about a source storage device corresponding to each storage partition, for example, a magnetic disk number or physical address information.

As shown in Table 3, the read-write control module corresponding to P1 is the OSD1, a source storage unit corresponding to P1 is a DISK1 on a SERVER1, and a source physical address corresponding to P1 is 100-199.

TABLE 3

Global partition information table

| Storage partition information | Read-write control module | Source storage device information | | |
|---|---|---|---|---|
| | | Source unit (optional) | Source node (optional) | Source physical address (optional) |
| P1 | OSD1 | DISK1 | Server1 | 100-199 |
| P2 | OSD1 | DISK3 | Server2 | 300-399 |
| P3 | SSA1 | LUN3 | SAN1 | 1000-1999 |
| ... | ... | ... | ... | ... |
| P30 | SSA1 | DISK2 | Server1 | 200-299 |

The distributed storage controller further includes a virtual block service VBS. After completing the deployment of the storage partitions and the read-write control module, the MDC may further deliver the foregoing global partition information table and view information of the read-write control module to the VBS. The VBS obtains an I/O view according to the information delivered by the MDC, where the I/O view is a sub-table of the global partition information table, is used to indicate an actual read-write control module corresponding to each storage partition, and includes a correspondence between the storage partition and the read-write control module. The I/O view may be directly delivered by the MDC to the VBS, and may also be generated by the VBS according to the global partition information table delivered by the MDC module.

The VBS may run on each server node in the server cluster system, and as a storage driver layer, is configured to provide a block access interface for an application module of the server cluster system, for example, a block device access interface based on the SCSI. After receiving a data read-write request delivered by an upper-layer application, the VBS determines a storage partition that needs to be read and written according to the data read-write request, determines, according to a view rule of the I/O view, a read-write control module (an OSD and an SSA) corresponding to the storage partition requested by the current data read-write request, and delivers the read-write data request to the corresponding read-write control module, to complete data reading and writing.

Specifically, the VBS may further support management of global metadata, where the global metadata records a global use condition of the storage partitions in the shared storage resource pool in the server cluster system and metadata of each storage partition. The global use condition includes information about an occupied storage partition and information about an idle storage partition. The metadata of each storage partition is used to indicate an allocation condition of each storage partition. In this embodiment of the present invention, the storage partitions are allocated in a storage allocation manner of block data. That is, each storage partition is used in a unit of a data block, and the use of the storage partition includes reading, writing, allocating, or the like. For example, when the storage partition is allocated to a user volume, a data block is used as a unit for allocation. For example, in this embodiment of the present invention, each storage partition is 10 GB in size, and the 10 GB storage partition may be divided equally into 10240 data blocks (Block). When data is read from each storage partition or data is written into each storage partition, a data block is used as a unit for reading and writing. Therefore, the metadata of each storage partition specifically includes a correspondence between Block IDs allocated to each storage partition, where multiple data blocks are allocated to each storage partition. The data blocks may be of a uniform size, or may not be limited in size. This embodiment of the present invention uses an example in which a size of each data block is 1 MB. In addition, in this embodiment of the present invention, an ID of each data block may include an ID of a user volume corresponding to the data block, or may include an ID of a user volume corresponding to the data block and a logical block address (Logical Block Address, LBA).

The metadata of each storage partition is, for example, shown in Table 4:

TABLE 4

Metadata of a storage partition

| Storage partition ID | Allocated data block | Physical address of an allocated data block (optional) | Size of an allocated data block (optional) |
|---|---|---|---|
| P1 | Block 1 (Volume 1 + LBA 1) | xxx-xxx | 1 MB |
| P2 | Block 2 (Volume 1 + LBA 2) | xxx-xxx | 1 MB |
| P3 | Block 3 (Volume 1 + LBA 3) | xxx-xxx | 1 MB |
| ... | ... | ... | ... |
| P30 | Block 100 (Volume 2 + LBA 70) | xxx-xxx | 1 MB |

A correspondence between a storage partition and an allocated data block may be in a Key-Value index form, where an ID of the data block is a Key value. For example, the Key value is related to an identifier of a user volume and a logical block address of the data block, and an ID of the storage partition is a Value value. It should be noted that, if the Key-Value index form is used, the VBS may also directly determine the correspondence by using an algorithm without maintaining the foregoing Table 4. When being started, the VBS may acquire allocation information of storage resources by traversing the hard disk of the server node and a magnetic disk of the storage array of the SAN node, and initialize stored metadata according to the global partition information table delivered by the MDC.

The distributed storage controller further includes a read-write control module, for example, an OSD that performs read-write control on a hard disk resource of the server node, and an SSA that performs read-write control on a storage resource of the storage array of the network storage node.

Specifically, the OSD mainly receives a read-write command from the VBS, and completes data storage in and data acquisition from the hard disk of the server node. The SSA mainly receives a read-write command from the VBS, and completes data storage in and data acquisition from the hard disk of the SAN node. The SSA is configured to implement an agent of an SAN device on a host. A view is set up, in the SSA, for storage information of each physical SAN device, access to each physical SAN/NAS device is performed by using the agent of the SSA, and an iSCSI interface function is added to the SSA.

Further, if a uniform physical address is allocated to the storage partitions in the shared storage resource pool, the SSA may further maintain a correspondence between the uniform physical address and an original LUN address on the SAN node, where the SSA may further determine, according to the correspondence, an address of an original LUN corresponding to the read-write request.

The foregoing server cluster system runs the distributed storage controller, where the MDC, the VBS, the OSD, and the SSA on the distributed storage controller can integrate and use heterogeneous storage resources, form a cluster-sharing resource pool by using various heterogeneous storage resources, and allocate and manage all the storage resources in a unified manner, thereby improving utilization of the storage resources. In addition, multiple storage partitions can be read or written simultaneously, thereby improving read-write performance and increasing an interest rate of the system.

Figure 3:
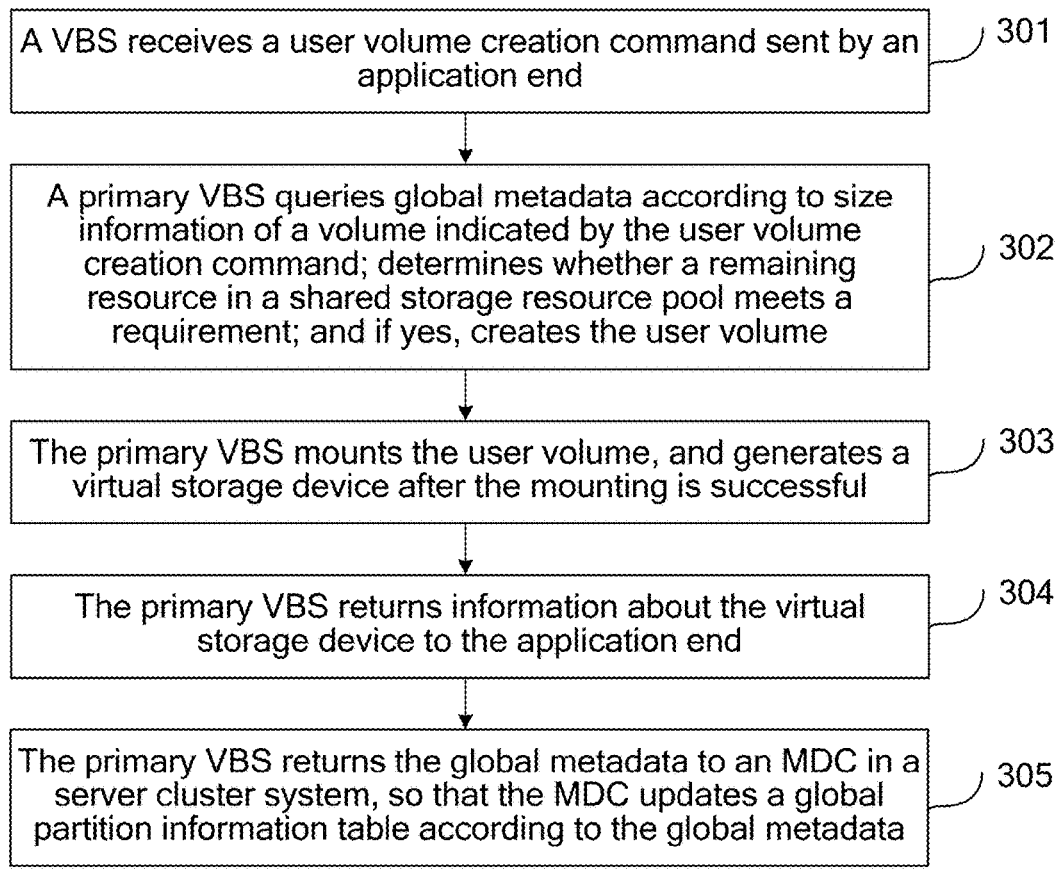
FIG. 3 is a flowchart of using a shared storage resource according to an embodiment of the present invention.

With reference to FIG. 1, FIG. 3 is a processing process of creating a user volume in a server cluster system that uses integration of heterogeneous storage resources according to an embodiment of the present invention.

S301: A VBS deployed on a server node in the server cluster system receives a user volume creation command sent by an application end.

Specifically, an application program (for example, a virtual machine) of the application end running in the server cluster system initiates the user volume creation command, where the command is forwarded by an application manager to a VBS deployed on any server node in the server cluster system (in a preferred manner, a VBS on a server node receives the user volume creation command, where a computing resource of the virtual machine initiating the command is located on the server node). Preferably, if the server cluster system in this embodiment of the present invention further provides a function of primary and secondary VBSs, after receiving the user volume creation command, the VBS may further determine whether the VBS is a primary VBS in the server cluster system. If not, the VBS forwards the user volume creation command to the primary VBS. In fact, deployment of the VBS is relatively flexible. The VBSs installed on all server nodes in the server cluster system may be of an equal rank, and in this case, configurations and functions of all VBSs are identical. It may also be that one VBS in the server cluster system is selected as the primary VBS, and the other VBSs are used as secondary VBSs. The primary VBS is configured to allocate a user volume/data block and manage metadata of a storage partition, and the secondary VBS is configured to query the metadata in the primary VBS, and perform an operation according to a command of the primary VBS. This embodiment of the present invention uses an example in which a server cluster system implements primary and secondary VBSs.

S302: A primary VBS queries global metadata according to size information of a volume indicated by the user volume creation command; determines whether a remaining resource in a shared storage resource pool meets a requirement; and if yes, creates the user volume, that is, determines a volume identifier (ID) of the user volume, allocates an initial storage partition to the user volume, and records the identifier of the user volume and information about the allocated initial storage partition in metadata of the initial storage partition.

Specifically, if the user volume creation command specifies the ID of the user volume, the primary VBS directly uses the ID of the user volume in the user volume creation command; if the user volume creation command does not specify the ID of the user volume, the VBS allocates an ID of the user volume to the user volume.

In a process of creating the user volume, the VBS may further allocate the initial storage partition to the user volume, that is, some storage partitions are selected from idle storage partitions as initial storage partitions of the user volume. A size of an initial storage resource of the user volume may be flexibly allocated according to a capacity of the user volume specified by the user volume creation command. The entire capacity of the user volume specified by the user volume creation command may be used as a capacity of the initial storage partition. For example, the user volume creation command requests to create a 5 GB user volume, and the VBS may allocate the entire 5 GB to the user volume as the initial storage partition. That is, the 5 GB is divided into 5120 data blocks with a size of 1 MB, the 5120 data blocks are deployed in the storage partitions P1-P30 in a distributed manner, and in this case, a size of the initial storage partition is 5 GB. The VBS may also use a thin allocation manner to allocate a part of the storage resource to the user volume according to an actual condition of the shared storage resource pool, for example, to allocate a 1 GB initial storage resource to the user volume. The 1 GB initial storage resource is divided into 1024 data blocks with a size of 1 MB, the 1024 data blocks are deployed in the storage partitions P1-P30 in the distributed manner, and in this case, the size of the initial storage partition is 1 GB.

The VBS records the ID of the user volume and the information about the allocated initial storage partition in metadata information of each initial storage partition in the global metadata.

When allocating the initial storage partition to the user volume, the VBS also allocates a corresponding source physical address to each data block of each user volume.

S303: The primary VBS mounts the user volume, and generates a virtual storage device after the mounting is successful.

S304: The primary VBS returns information about the virtual storage device to the application end.

S305: The primary VBS returns the global metadata to an MDC in the server cluster system, so that the MDC updates a global partition information table according to the global metadata.

Step 305 is an optional step, and may be implemented in a flexible sequence.

Figure 4:
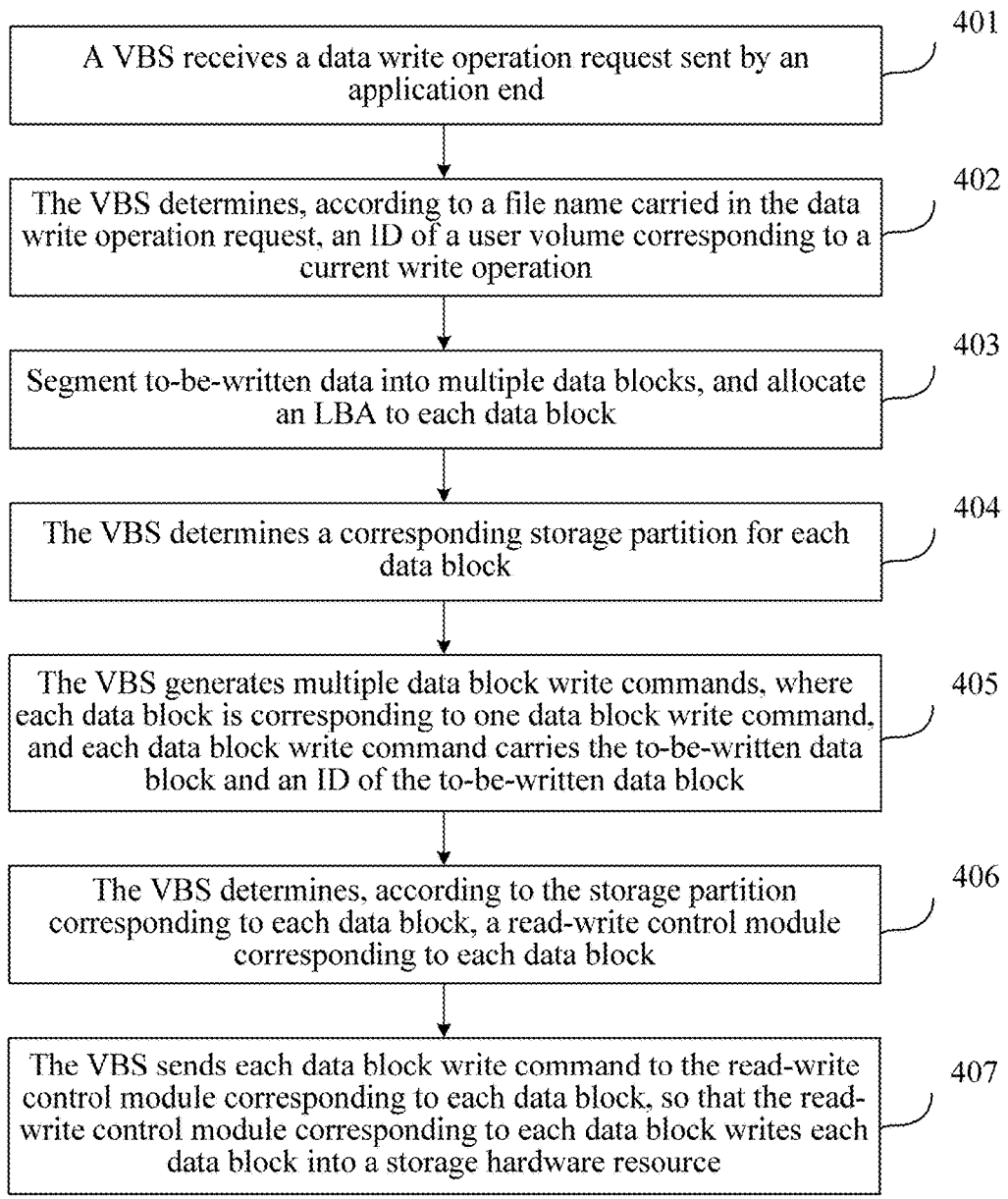
FIG. 4 is another flowchart of using a shared storage resource according to an embodiment of the present invention.

With reference to FIG. 1, FIG. 4 is a processing process in which a user writes data in a server cluster system that uses integration of heterogeneous storage resources according to an embodiment of the present invention.

S401: After any application program running in the server cluster system initiates a data write operation, a VBS in the server cluster system receives a data write operation request.

The data write operation request carries a file name and to-be-written data.

S402: The VBS determines, according to a file name carried in the data write operation request, an ID of a user volume corresponding to the current write operation.

The VBS may further compute, according to the to-be-written data, a size of the to-be-written data.

The VBS allocates an LBA to the to-be-written data (allocating an LBA is optional in this step, and the VBS may also not allocate an LBA to the to-be-written data in this step).

For example, the VBS determines Volume ID 1, Size=1 GB, and LBA: 001×−221× for the current write operation.

S403: The VBS segments to-be-written data into multiple data blocks, and allocates an LBA to each data block.

The VBS may equally segment the to-be-written data according to a unit, for example, segmenting the data according to 1 MB, that is, segmenting the data according to a use unit of each storage partition each time. In this embodiment, the VBS segments the to-be-written data with the size of 1 GB into 1024 data blocks, where a size of each data block is 1 MB. If remaining to-be-written data is less than 1 MB, a size of the last data block is an actual size of the remaining to-be-written data. The VBS further allocates the corresponding LBA to each data block.

For example:
Block1 LBA: 0000-1024
Block2 LBA: 1025-2048
. . .

S404: The VBS determines a corresponding storage partition for each data block.

Specifically, the VBS first determines the logical block address (LBA) of each to-be-written data block, then combines the ID of the user volume and the LBA of each data block into a key value of each data block, and determines, according to a distributed storage algorithm, such as a hash algorithm, the storage partition corresponding to each data block. The LBA herein may be a value after an original LBA is processed, for example, the LBA 0000-1024 corresponding to the block1 is corresponding to 1, and the LBA 1025-2048 corresponding to the block2 is corresponding to 2.

S405: The VBS generates multiple data block write commands, where each data block is corresponding to one data block write command, and each data block write command carries the to-be-written data block, and an ID of the to-be-written data block (for example, a Block ID includes the ID of the user volume and the LBA of the to-be-written data block).

This step may also be performed after subsequent steps are completed, and specific implementation is not limited to any time sequence.

S406: The VBS determines, according to the storage partition corresponding to each data block, a read-write control module corresponding to each data block.

Specifically, the VBS determines, according to a global partition information table, the read-write control module corresponding to each data block.

S407: The VBS sends each data block write command to the read-write control module corresponding to each data block, so that the read-write control module corresponding to each data block writes each data block into a storage hardware resource.

Specifically, if an OSD receives the data block write command, the OSD queries, according to the ID of the to-be-written data block, data block metadata stored by the OSD, and determines whether an operation to be performed by the OSD on the ID of the data block is a first operation. If it is the first operation, the OSD allocates an actual physical address to the to-be-written data block, writes the to-be-written data block into a magnetic disk corresponding to the physical address, updates the data block metadata stored by the OSD, and records a correspondence between the ID of the to-be-written data block and the physical address. If it is not the first operation, the OSD queries, according to the ID of the to-be-written data block, the data block metadata stored by the OSD, determines a physical address corresponding to the to-be-written data block, and writes the to-be-written data block into the physical address obtained by query.

If an SSA receives the data block write command, the SSA queries, according to the ID of the to-be-written data block, data block metadata stored by the SSA, and determines whether an operation to be performed by the SSA on the ID of the data block is a first operation. If it is the first operation, the SSA allocates a logical address in a storage array of an actual SAN storage node to the to-be-written data block, that is, an LUN address, writes the to-be-written data block into a magnetic disk corresponding to the LUN address, updates the data block metadata stored by the SSA, and records a correspondence between the ID of the to-be-written data block and the LUN address. If it is not the first operation, the OSD queries, according to the ID of the to-be-written data block, the data block metadata stored by the OSD, determines an LUN address corresponding to the to-be-written data block, and writes the to-be-written data block into the LUN address obtained by query.

During a write operation, the OSD or the SSA may first write the data block into a local cache layer, that is, return a response message, thereby improving storage efficiency.

Figure 5:
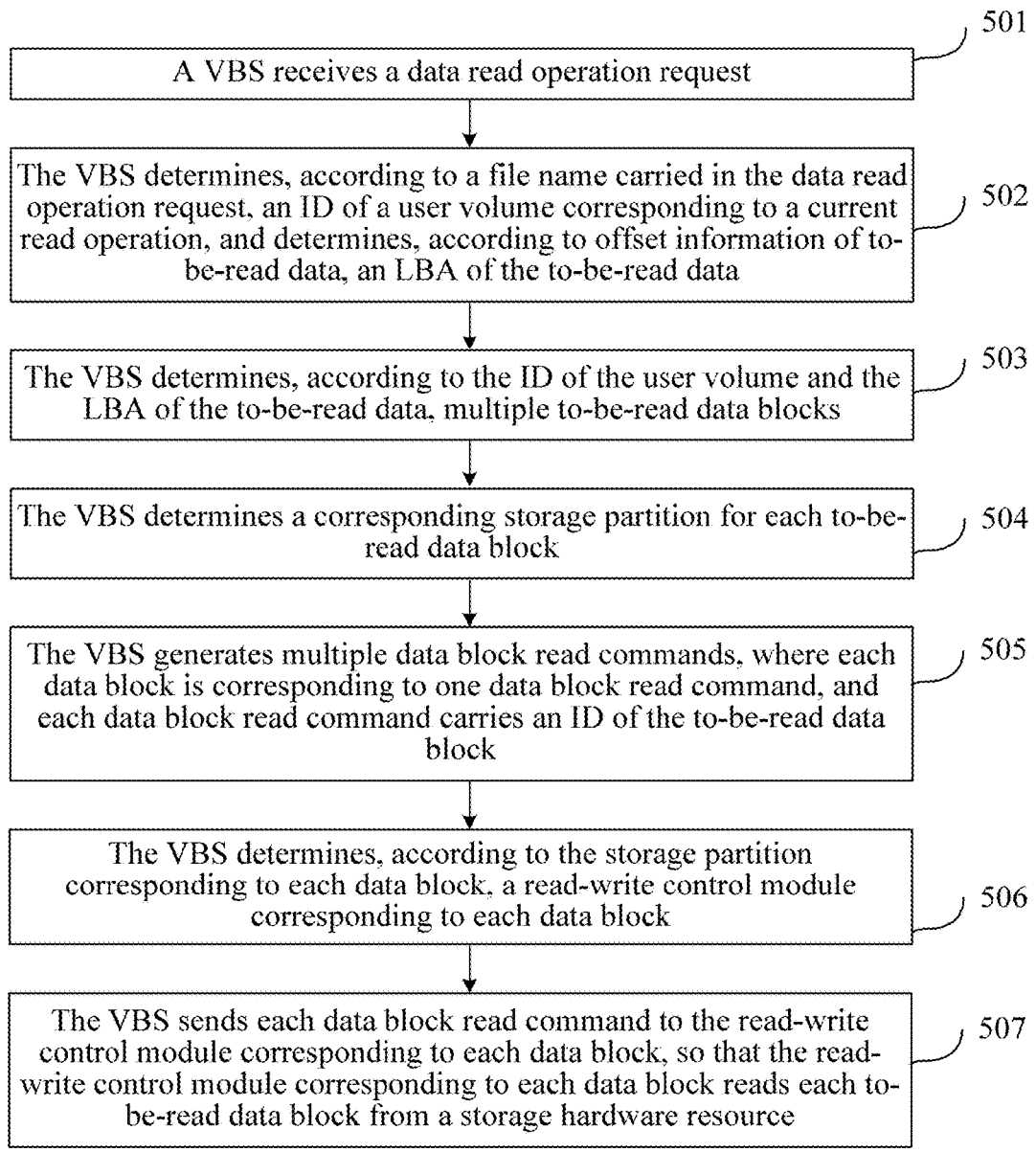
FIG. 5 is another flowchart of using a shared storage resource according to an embodiment of the present invention.

With reference to FIG. 1, FIG. 5 is a processing process in which a user reads data in a server cluster system that uses integration of heterogeneous storage resources according to an embodiment of the present invention.

S501: After any application program running in the server cluster system initiates a data read operation, a VBS in the server cluster system receives a data read operation request.

The data read operation request carries a file name and offset information of to-be-read data.

S502: The VBS determines, according to a file name carried in the data read operation request, an ID of a user volume corresponding to the current read operation, and determines, according to offset information of to-be-read data, an LBA of the to-be-read data.

S503: The VBS determines multiple to-be-read data blocks according to the ID of the user volume and the LBA of the to-be-read data.

Specifically, an ID of each to-be-read data block includes the user volume and an LBA of each data block, where the LBA of each data block may be determined according to an amount of the to-be-read data and an offset of the to-be-read data.

S504: The VBS determines a corresponding storage partition for each to-be-read data block.

Specifically, the VBS first determines the logical block address (LBA) of each to-be-read data block, then combines the ID of the user volume and the LBA of each data block into a key value of each data block, and determines, according to a distributed storage algorithm, such as a hash algorithm, the storage partition corresponding to each data block.

S505: The VBS generates multiple data block read commands, where each data block is corresponding to one data block read command, and each data block read command carries an ID of the to-be-read data block (for example, a Block ID includes the ID of the user volume and an LBA of the to-be-read data block).

S506: The VBS determines, according to the storage partition corresponding to each data block, a read-write control module corresponding to each data block.

Specifically, the VBS determines, according to a global partition information table, the read-write control module corresponding to each data block.

S507: The VBS sends each data block read command to the read-write control module corresponding to each data block, so that the read-write control module corresponding to each data block reads each to-be-read data block from a storage hardware resource.

Specifically, if an OSD receives the data block read command, the OSD queries, according to the ID of the to-be-read data block, data block metadata stored by the OSD, determines an actual physical address allocated to the to-be-read data block, and reads the to-be-written data block from a magnetic disk corresponding to the physical address.

If an SSA receives the data block write command, the SSA queries, according to the ID of the to-be-written data block, data block metadata stored by the SSA, determines an actual logical address in a storage array of an SAN storage node, that is, an LUN address, which is allocated to the to-be-read data block, and reads the to-be-read data block from a magnetic disk corresponding to the LUN address.

By using a cluster system for computing, storage, and integration according to this embodiment of the present invention, problems of complicated operation and high cost due to use of a dedicated SAN in the prior art are solved in terms of hardware. There may be multiple storage devices, and a cache may be deployed on each storage device, thereby greatly enhancing an expansion capability of a cache on a storage end in terms of hardware. A storage resource does not rely on a computing resource, and can be independently increased and decreased, thereby enhancing scalability of a system. A persistent magnetic disk and a cache resource in the system are virtualized into a shared resource pool and shared by all computing, all computing and storage may participate in data reading and data writing, and storage performance of the system is improved by means of concurrency improvement. In addition, the cluster system for computing, storage, and integration according to this embodiment of the present invention uses a high-speed data exchange network to perform communication, and therefore a data exchange speed is further increased.

Figure 6:
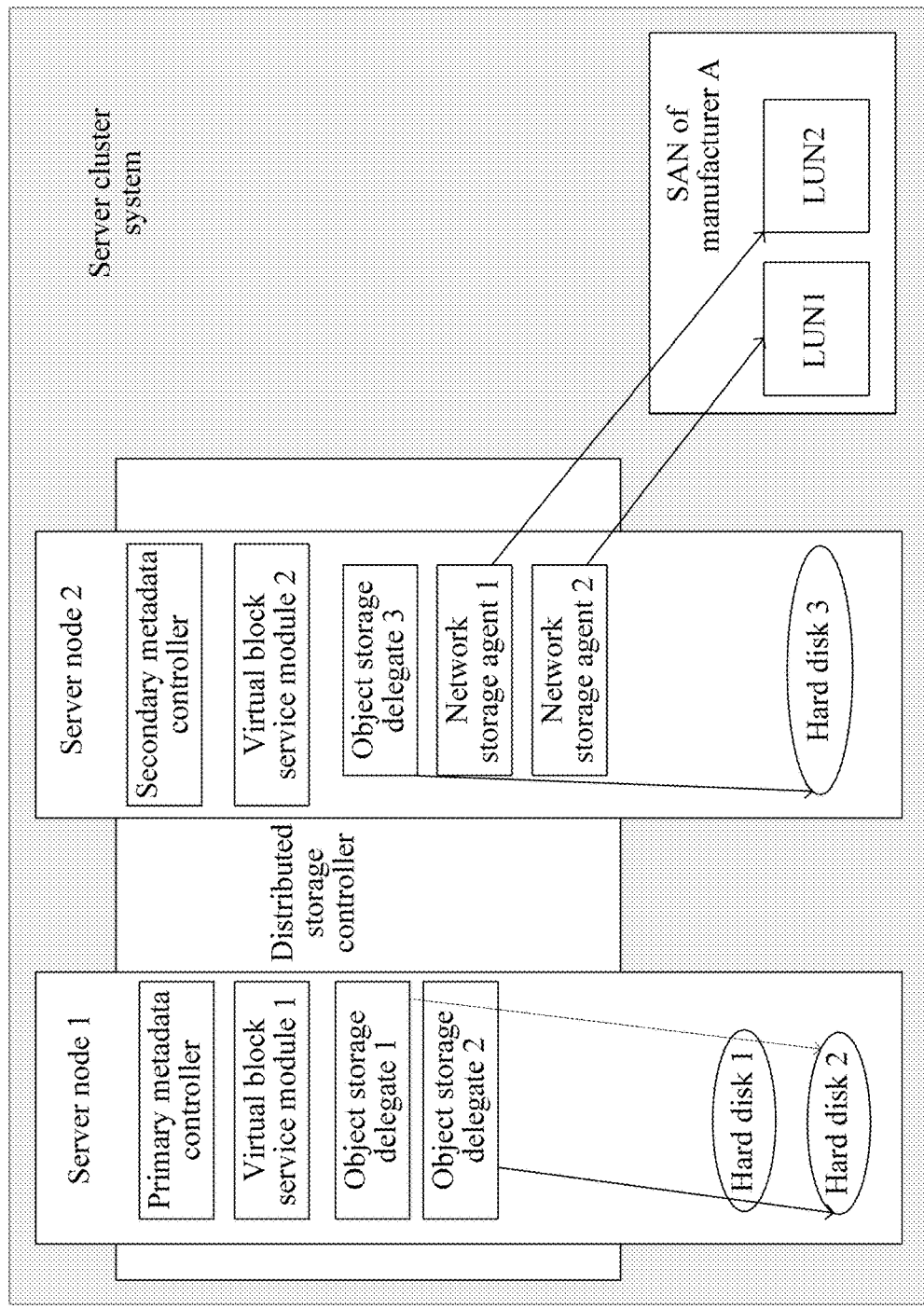
FIG. 6 is another schematic block diagram of a server cluster system according to an embodiment of the present invention.

FIG. 6 is another composition diagram of a server cluster system according to an embodiment of the present invention. The server cluster system includes server nodes 1 and 2, and a network storage node, that is, an SAN device of a manufacturer A, where the server node 1 includes hard disks 1 and 2, the server node 2 includes a hard disk 3, the network storage node includes a storage array, that is, LUN1 and LUN2, a distributed storage controller runs on the server nodes, and the distributed storage controller includes:

metadata controllers, deployed on the two server nodes in this embodiment, where the metadata controller deployed on the server node 1 is a primary MDC, the metadata controller deployed on the server node 2 is a secondary MDC, and the metadata controllers are configured to: divide storage resources of the hard disks and the storage array into multiple storage partitions, where the multiple storage partition form a shared storage resource pool; allocate a read-write control module to each storage partition; generate global partition information, where the global partition information records a correspondence between each storage partition in the shared storage resource pool and the read-write control module; and deliver the global partition information to a virtual block service module;

the virtual block service module, where a VBS is deployed on each server node in this embodiment, configured to: face a service layer, and receive a storage request message; determine a storage partition corresponding to the storage request message; determine, according to the global partition information, a read-write control module that is corresponding to the storage partition corresponding to the storage request message; and send the storage request message to the determined read-write control module; and the read-write control module, configured to face the hard disks or the network storage node, and perform an operation requested by the storage request message, where the read-write control module in this embodiment includes an OSD1 and an OSD2 that are deployed on the server node 1, and an OSD3, an SSA1 and an SSA2 that are deployed on the server node 2, where the OSD1 is configured to perform read-write control on the hard disk 1, the OSD2 is configured to perform read-write control on the hard disk 2, the OSD3 is configured to perform read-write control on the hard disk 3, the SSA1 is configured to perform read-write control on the LUN1, and the SSA2 is configured to perform read-write control on the LUN2.

The metadata controller is further configured to: separately determine deployment conditions of the object storage delegate and the SAN storage agent on the server node; generate view information of the read-write control module according to the determined deployment conditions, where the view information of the read-write control module is used to indicate information about a server node on which each read-write control module is deployed; and deliver the view information of the read-write control module to the virtual block service module.

Further, the metadata controller is specifically configured to: determine to deploy the object storage delegate on a server node that has a hard disk resource in the server cluster system, and determine to deploy the SAN storage agent on a server node with small load in the server cluster system.

For example, in this embodiment, the metadata controller deploys the SSA1 and the SSA2 on the server node 2.

The virtual block service module is specifically configured to determine routing information of the read-write control module according to the view information of the read-write control module, and send the storage request message to the determined read-write control module.

In this embodiment shown in FIG. 6, the method described in any one of FIG. 3 to FIG. 5 may be further executed, which is not described in detail again in this embodiment of the present invention.

Figure 7:
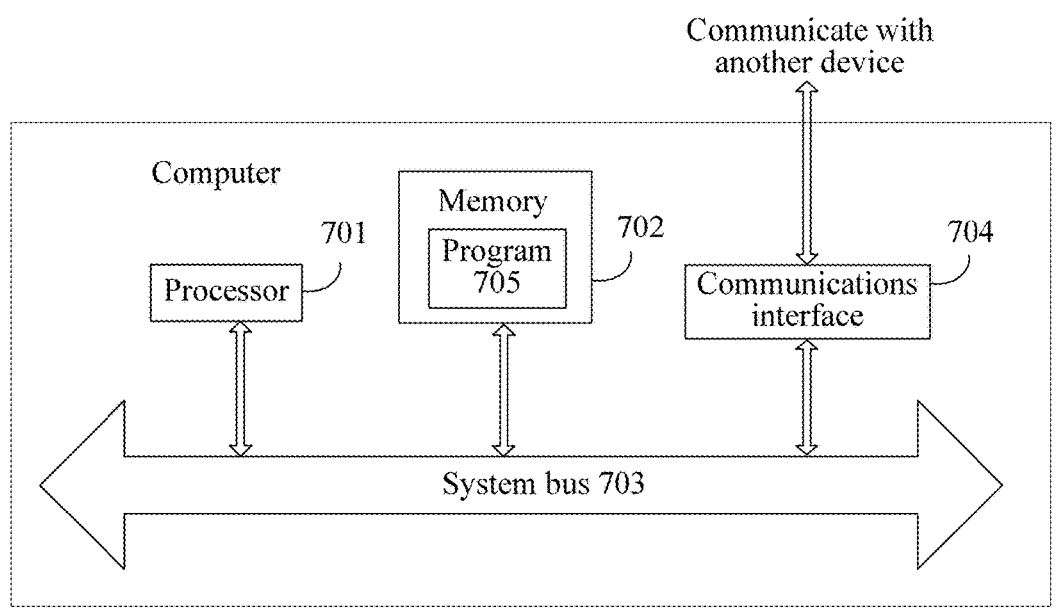
FIG. 7 is a composition diagram of a computer according to an embodiment of the present invention.

FIG. 7 is a schematic composition diagram of a structure of a computer according to an embodiment of the present invention. The computer of this embodiment of the present invention may include:

a processor 701, a memory 702, a system bus 704, and a communications interface 705, where the CPU 701, the memory 702, and the communications interface 705 are connected and complete mutual communication by using the system bus 704.

The processor 701 may be a single-core or multi-core central processing unit, or a specific integrated circuit, or may be configured as one or more integrated circuits that implement this embodiment of the present invention.

The memory 702 may be a high-speed RAM memory, or may be a non-volatile memory (non-volatile memory), for example, at least one magnetic disk memory.

The memory 702 is configured to store a computer execution instruction 703. Specifically, the computer execution instruction 703 may include program code.

When the computer runs, the processor 701 runs the computer execution instruction 703, and may execute the method provided by any one embodiment of the embodiments of the present invention. More specifically, if a distributed storage controller described in the embodiments of the present invention is implemented by using computer code, the computer performs a function of the distributed storage controller of the embodiments of the present invention.

It should be understood that, in the embodiments of the present invention, "B corresponding to A" indicates that B is associated with A, and B may be determined according to A. However, it should be further understood that determining B according to A does not mean that B is determined according to A only; B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the embodiments provided in the present application, it should be understood that the disclosed system may be implemented in other manners. For example, the described system embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sharing a storage resource by a distributed storage controller in a server cluster system, comprising:

allocating a plurality of storage partitions;
generating global partition information recording a correspondence between an allocated read-write control module and each storage partition;
receiving a storage request message;
determining an ID of a user volume in which data to be operated according to the storage request message is located and a logical block address (LBA) of at least one data block of the data to be operated;
determining an ID of the at least one data block according to the ID of the user volume and the LBA of the at least one data block;
querying metadata according to the ID of the at least one data block;
storing the metadata of the target storage partition associated with the storage request message, wherein the metadata records a correspondence between the target storage partition associated with the storage request message and the ID of the at least one data block;
determining the target storage partition associated with the storage request message;
determining that the allocated read-write control module corresponds to the target storage partition associated with the storage request message according to the global partition information; and
sending the storage request message to the allocated read-write control module.

2. A method for sharing a storage resource by a distributed storage controller in a server cluster system, comprising:
allocating a plurality of storage partitions;
generating global partition information recording a correspondence between an allocated read-write control module and each storage partition;
receiving a storage request message comprising a user volume creation command carrying a size of the user volume;
determining an ID of a user volume in which data to be operated according to the storage request message is located and a logical block address (LBA) of at least one data block of the data to be operated;
determining according to the ID of the user volume and the LBA of the at least one data block, the target storage partition associated with the storage request message;
determining that the allocated read-write control module corresponds to the target storage partition associated with the storage request message according to the global partition information; and
sending the storage request message to the allocated read-write control module;
wherein the determining an ID of a user volume and the determining the target storage partition comprise:
determining according to the size of the user volume, a size of an initial storage resource allocated to the user volume;
determining the LBA of the at least one data block according to the size of the initial storage resource; and
determining according to the ID of the user volume and the LBA of the at least one data block, the target storage partition associated with the storage request message.

3. A method for sharing a storage resource by a distributed storage controller in a server cluster system, comprising:
allocating a plurality of storage partitions;
generating global partition information recording a correspondence between an allocated read-write control module and each storage partition;
receiving a storage request message comprising a data write operation request carrying a file name;
determining an ID of a user volume in which data to be operated according to the storage request message is located and a logical block address (LBA) of at least one data block of the data to be operated;
determining according to the ID of the user volume and the LBA of the at least one data block, the target storage partition associated with the storage request message;
determining that the allocated read-write control module corresponds to the target storage partition associated with the storage request message according to the global partition information; and
sending the storage request message to the allocated read-write control module;
wherein the determining an ID of a user volume and the determining the target storage partition comprise:
determining the ID of the user volume according to the file name;
dividing to-be-written data into multiple to-be-written data blocks;
allocating an LBA to each to-be-written data block; and
determining according to the ID of the user volume, and the LBA of said each to-be-written data block, a target storage partition associated with said each to-be-written data block.

4. A method for sharing a storage resource by a distributed storage controller in a server cluster system, comprising:
allocating a plurality of storage partitions;
generating global partition information recording a correspondence between an allocated read-write control module and each storage partition;
receiving a storage request message comprising a data read operation request carrying a file name and an offset of to-be-read data blocks;
determining an ID of a user volume in which data to be operated according to the storage request message is located and a logical block address (LBA) of at least one data block of the data to be operated;
determining according to the ID of the user volume and the LBA of the at least one data block, the target storage partition associated with the storage request message;
determining that the allocated read-write control module corresponds to the target storage partition associated with the storage request message according to the global partition information; and
sending the storage request message to the allocated read-write control module;
wherein the determining an ID of a user volume and the determining the target storage partition comprise:
determining the ID of the user volume according to the file name;
determining a LBA of the to-be-read data blocks according to the offset of the to-be-read data blocks; and
determining according to the ID of the user volume and the LBA of the to-be-read data blocks, the target storage partition associated with the storage request message.

5. A distributed storage controller of server cluster system, comprising;
a plurality of read-write control modules allocated to each of a corresponding plurality of storage partitions, wherein each read-write control module is assigned to one of the corresponding plurality of storage partitions;
memory or storage that includes global partition information recording a correspondence between each of the allocated read-write control modules and each corresponding storage partition of the plurality of storage partitions;

computer instructions stored in either the storage or the memory that, when executed by a processor, prompts the distributed storage controller to perform the steps of:
receiving a storage request message;
determining an ID of a user volume in which data to be operated according to the storage request message is located and a logical block address (LBA) of at least one data block of the data to be operated;
determining an ID of the at least one data block according to the ID of the user volume and the LBA of the at least one data block;
storing metadata of the target storage partition associated with the storage request message, wherein the metadata records a correspondence between the target storage partition associated with the storage request message and the ID of the at least one data block;
querying the metadata according to the ID of the at least one data block;
determining the target storage partition associated with the storage request message;
determining according to the global partition information, a read-write control module that corresponds to the target storage partition associated with the storage request message; and
sending the storage request message to the determined read-write control module.

6. A distributed storage controller of server cluster system, comprising;
a plurality of read-write control modules allocated to each of a corresponding plurality of storage partitions, wherein each read-write control module is assigned to one of the corresponding plurality of storage partitions;
memory or storage that includes global partition information recording a correspondence between each of the allocated read-write control modules and each corresponding storage partition of the plurality of storage partitions;
computer instructions stored in either the storage or the memory that, when executed by a processor, prompts the distributed storage controller to perform the steps of:
receiving a storage request message comprising a user volume creation command carrying a size of the user volume;
determining an ID of a user volume in which data to be operated according to the storage request message is located and a logical block address (LBA) of at least one data block of the data to be operated;
determining according to the ID of the user volume and the LBA of the at least one data block, the target storage partition associated with the storage request message;
determining that the allocated read-write control module corresponds to the target storage partition associated with the storage request message according to the global partition information; and
sending the storage request message to the allocated read-write control module; wherein the distributed storage controller is configured to:
determine a size of an initial storage resource allocated to the user volume according to the size of the user volume;
determine the LBA of the at least one data block according to the size of the initial storage resource; and
determine according to the ID of the user volume and the LBA of the at least one data block, the target storage partition associated with the storage request message.

7. A distributed storage controller of server cluster system, comprising;
a plurality of read-write control modules allocated to each of a corresponding plurality of storage partitions, wherein each read-write control module is assigned to one of the corresponding plurality of storage partitions;
memory or storage that includes global partition information recording a correspondence between each of the allocated read-write control modules and each corresponding storage partition of the plurality of storage partitions;
computer instructions stored in either the storage or the memory that, when executed by a processor, prompts the distributed storage controller to perform the steps of:
receiving a storage request message comprising a data write operation request carrying a file name;
determining an ID of a user volume in which data to be operated according to the storage request message is located and a logical block address (LBA) of at least one data block of the data to be operated;
determining according to the ID of the user volume and the LBA of the at least one data block, the target storage partition associated with the storage request message;
determining that the allocated read-write control module corresponds to the target storage partition associated with the storage request message according to the global partition information; and
sending the storage request message to the allocated read-write control module;
wherein the distributed storage controller is configured to:
determine the ID of the user volume according to the file name;
divide to-be-written data into multiple to-be-written data blocks;
allocate an LBA to each to-be-written data block; and
determine according to the ID of the user volume, and the LBA of said each to-be-written data block, a target storage partition associated with said each to-be-written data block.

8. A distributed storage controller of server cluster system, comprising;
a plurality of read-write control modules allocated to each of a corresponding plurality of storage partitions, wherein each read-write control module is assigned to one of the corresponding plurality of storage partitions;
memory or storage that includes global partition information recording a correspondence between each of the allocated read-write control modules and each corresponding storage partition of the plurality of storage partitions;
computer instructions stored in either the storage or the memory that, when executed by a processor, prompts the distributed storage controller to perform the steps of:
receiving a storage request message comprising a data read operation request carrying a file name and an offset of to-be-read data blocks;
determining an ID of a user volume in which data to be operated according to the storage request message is located and a logical block address (LBA) of at least one data block of the data to be operated;

determining according to the ID of the user volume and the LBA of the at least one data block, the target storage partition associated with the storage request message;

determining that the allocated read-write control module corresponds to the target storage partition associated with the storage request message according to the global partition information; and sending the storage request message to the allocated read-write control module;

wherein the distributed storage controller is configured to:

determine the ID of the user volume according to the file name;

determine a LBA of the to-be-read data blocks according to the offset of the to-be-read data blocks; and determine according to the ID of the user volume and the LBA of the to-be-read data blocks, the target storage partition associated with the storage request message.

* * * * *